US010266246B2

(12) United States Patent
Reddy et al.

(10) Patent No.: US 10,266,246 B2
(45) Date of Patent: Apr. 23, 2019

(54) FIRE RETARDANT AVIATION LAMINATE

(71) Applicant: GOODRICH CORPORATION, Charlotte, NC (US)

(72) Inventors: Chana Kesava Reddy, Hyderabad (IN); Ashish Kumar Agarwal, Karnataka (IN); Christopher L. Chapman, Lanesville, IN (US); Satya Swaroop Panda, Karnataka (IN)

(73) Assignee: GOODRICH CORPORATION, Charlotte, NC (US)

( * ) Notice: Subject to any disclaimer, the term of this patent is extended or adjusted under 35 U.S.C. 154(b) by 233 days.

(21) Appl. No.: 15/298,410

(22) Filed: Oct. 20, 2016

(65) Prior Publication Data

US 2018/0057139 A1  Mar. 1, 2018

(30) Foreign Application Priority Data

Aug. 26, 2016  (IN) .............................. 201611029146

(51) Int. Cl.
| | | |
|---|---|---|
| *B32B 7/12* | (2006.01) | |
| *B64C 1/40* | (2006.01) | |
| *B32B 21/04* | (2006.01) | |
| *B32B 21/13* | (2006.01) | |
| *B32B 21/14* | (2006.01) | |
| *B64C 1/06* | (2006.01) | |
| *B32B 19/04* | (2006.01) | |
| *B32B 21/02* | (2006.01) | |

(52) U.S. Cl.
CPC ................ *B64C 1/40* (2013.01); *B32B 7/12* (2013.01); *B32B 19/042* (2013.01); *B32B 21/02* (2013.01); *B32B 21/042* (2013.01); *B32B 21/13* (2013.01); *B32B 21/14* (2013.01); *B64C 1/066* (2013.01); *B32B 2250/05* (2013.01); *B32B 2255/08* (2013.01); *B32B 2255/26* (2013.01); *B32B 2264/108* (2013.01); *B32B 2264/12* (2013.01); *B32B 2307/3065* (2013.01); *B32B 2479/00* (2013.01); *B32B 2605/003* (2013.01); *B32B 2605/18* (2013.01); *B32B 2607/00* (2013.01)

(58) Field of Classification Search
CPC ......... B32B 7/12; B32B 19/042; B32B 21/02; B32B 21/042; B32B 21/13; B32B 21/14; B32B 2250/05; B32B 2255/08; B32B 2255/26; B32B 2264/108; B32B 2264/12; B32B 2307/3065; B32B 2479/00; B32B 2605/003; B32B 2605/18; B32B 2607/00; B64C 1/066; B64C 1/40
USPC ..................................................... 428/537.1
See application file for complete search history.

(56) References Cited

U.S. PATENT DOCUMENTS

| | | | |
|---|---|---|---|
| 5,942,330 A | 8/1999 | Kelley | |
| 6,589,655 B2 | 7/2003 | Matuana et al. | |
| 7,988,809 B2 | 8/2011 | Smith et al. | |
| 8,083,878 B1 | 12/2011 | Booth et al. | |
| 8,458,971 B2 | 6/2013 | Winterowd et al. | |
| 8,808,850 B2 | 8/2014 | Dion | |
| 9,085,678 B2 | 7/2015 | Basfar et al. | |
| 2005/0247025 A1* | 11/2005 | Coronado | ................ B32B 3/10 52/796.1 |
| 2012/0148824 A1 | 6/2012 | Martin et al. | |
| 2014/0234632 A1 | 8/2014 | Nolte et al. | |

FOREIGN PATENT DOCUMENTS

| | | | |
|---|---|---|---|
| BE | 680195 | * | 10/1966 |
| BE | 680195 A | | 10/1966 |
| EP | 2746045 A1 | | 6/2014 |
| WO | 2015058820 A1 | | 4/2015 |

OTHER PUBLICATIONS

Yuan-Xiang Fu et al : Thermal conductivity enhancement of epoxy adhesive using graphene sheets as additives IJOTS, vol. 86, Dec. 2014, pp. 276-283.*
Yuan-Xiang Fu et al: "Thermal conductivity enhancement with different fillers for epoxy resin adhesives", ATE, vol. 66, No. 1-2, May 2014, pp. 493-498.*
Fu et al., "Thermal conductivity enhancement of epoxy adhesive using graphene sheets as additives", ScienceDirect, vol. 86, Dec. 2014, pp. 276-283.
Fu et al., "Thermal conductivity enhancement with different fillers for epoxy resin adhesives", ScienceDirect, vol. 66, Issues 1-2, May 2014, pp. 493-498.
Search Report dated Dec. 8, 2017 in EP application No. 17187739, 8 pages.

* cited by examiner

*Primary Examiner* — Leszek B Kiliman
(74) *Attorney, Agent, or Firm* — Cantor Colburn LLP

(57) ABSTRACT

An aviation laminate includes a plurality of wooden elements, and an adhesive disposed between the plurality of wooden elements, wherein the adhesive includes a thermal filler, wherein the thermal filler is at least one of graphene, hexagonal boron nitride and intumescent powder.

14 Claims, 3 Drawing Sheets

FIRE RETARDANT AVIATION LAMINATE

CROSS-REFERENCE TO RELATED APPLICATIONS

This application claims priority to and the benefit of Indian Patent Application No. 201611029146 filed on Aug. 26, 2016, and all the benefits accruing therefrom under 35 U.S.C. § 119, the content of which is incorporated herein in its entirety by reference.

BACKGROUND

The subject matter disclosed herein relates to laminate materials, and more particularly, to aviation laminates for aircraft interior components.

Interior surfaces of an aircraft are required to be fire retardant or fire resistant to comply with aviation regulations and to minimize the risk of fire. Natural and composite veneers are used within an aircraft to cover aircraft interior components. Veneers are often treated with a fire retardant solution to prevent the spread of a fire within the aircraft. However, treating veneers with a fire retardant solution may require additional labor, cause discoloration of the veneer and may not provide consistent results.

BRIEF SUMMARY

According to an embodiment, an aviation laminate includes a plurality of wooden elements, and an adhesive disposed between the plurality of wooden elements, wherein the adhesive includes a thermal filler, wherein the thermal filler is at least one of graphene, hexagonal boron nitride and intumescent powder.

According to an embodiment, an aircraft includes an aircraft cabin component, including an aviation laminate, the aviation laminate including a plurality of wooden elements, and an adhesive disposed between the plurality of wooden elements, wherein the adhesive includes a thermal filler, wherein the thermal filler is at least one of graphene, hexagonal boron nitride and intumescent powder.

Technical function of the embodiments described above includes that the adhesive includes a thermal filler, wherein the thermal filler is at least one of graphene, hexagonal boron nitride and intumescent powder.

Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the FIGURES:

DETAILED DESCRIPTION

Figure 1:
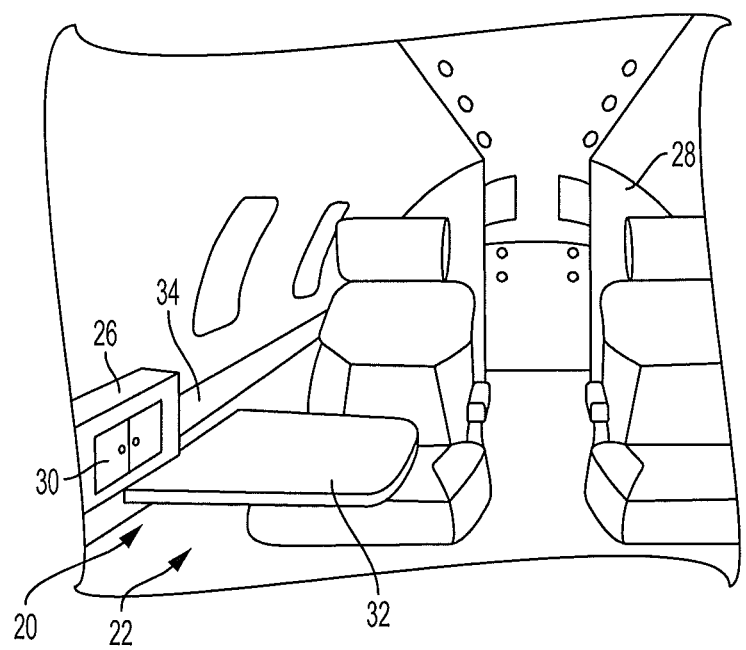
FIG. 1 is pictorial view of an aircraft interior.

Referring to the drawings, FIG. 1 shows an interior cabin 22 of an aircraft 20. The aircraft 20 may be any variety of aircraft including helicopters and airplanes that may be designed in accordance with government regulations pertaining to the propagation of cabin fire and burn characteristics of interior cabin components. In the illustrated embodiment, the interior cabin 22 of the aircraft 20 can include cabin components such as interior cabinetry 26, bulkheads 28 (e.g., decorative walls), doors 30, table tops 32, credenzas 34 and other components that may include decorative surfaces.

In the illustrated embodiment, the interior components within the interior cabin 22 can be formed from aviation laminates. In the illustrated embodiment, the aviation laminates as described herein are substantially fire-resistant without the use of additional or supplemental treatments. Advantageously, by utilizing aviation laminates described herein, the interior cabin 22 can provide decorative surfaces that require less process steps to produce while providing the desired level of fire resistance.

Figure 2:
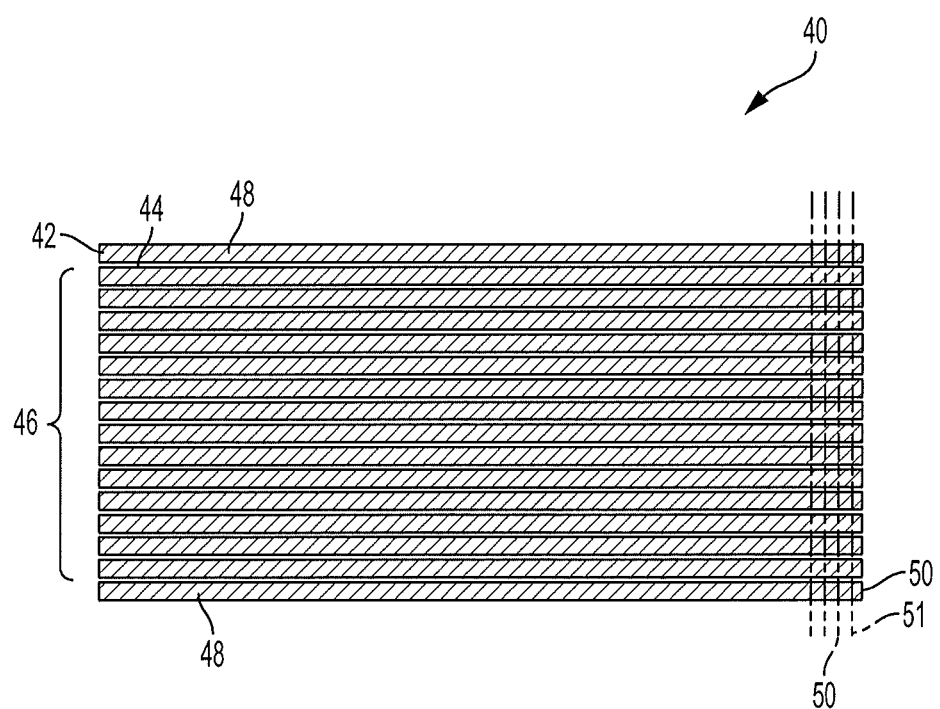
FIG. 2 is a pictorial view of a composite veneer for use with the aircraft interior of FIG. 1.

In FIG. 2, a composite veneer 40 suitable for use as aviation laminate within the interior cabin 22 is shown. In the illustrated embodiment, the composite veneer 40 includes veneer leafs 42 and an adhesive 44. In the illustrated embodiment, the composite veneer 40 can be utilized to provide a decorative surface without the cost or weight of other materials while further providing a fire-resistant material to form interior components of the interior cabin 22. Advantageously, the use of a composite veneer 40 allows for a consistent grain pattern while providing additional support for any suitable interior componentry.

In the illustrated embodiment, the veneer leafs 42 can be formed from any suitable type of wood or any other suitable material. In the illustrated embodiment, the veneer leafs 42 are thin slices or elements of wood that can be utilized to provide a desired appearance. In the illustrated embodiment, various types of wood can be combined to provide a desired appearance or characteristic of the composite veneer 40. The veneer leafs 42 can be stacked or otherwise disposed on top of each other when forming the composite veneer 40. In the illustrated embodiment, the veneer leafs 42 can be stacked to have outer layers 48 on either end of the composite veneer 40 with intermediate layers 46 disposed within the outer layers 48.

In the illustrated embodiment, adhesive 44 can be used to bond the veneer leafs 42 together. In the illustrated embodiment, the adhesive 44 is disposed in adhesive layers between the layers of the veneer leafs 42. In certain embodiments, the adhesive 44 layers are only disposed between the intermediate layers 46 of the veneer leaf 42. In the illustrated embodiment, the adhesive 44 can be any suitable adhesive, including but not limited to polyurethane epoxy.

In the illustrated embodiment, the adhesive 44 includes a thermal filler additive to provide fire-retardant and fire resistant capabilities to the composite veneer 40. In the illustrated embodiment, the use of the thermal filler additive within the adhesive 44 allows for the composite veneer 40 to provide a desired lever of fire resistance without requiring any additional processing while providing consistent results. In the illustrated embodiment, any suitable thermal filler additive can be used within the adhesive 44, including, but not limited to thermally conductive fillers and thermally resistive fillers.

In certain embodiments, thermally conductive fillers to be added to the adhesive to facilitate heat transfer within the adhesive 44 and the composite veneer 40. In the illustrated embodiment, the adhesive 44 can include thermally conductive fillers including, but not limited to, graphene and hexagonal boron nitride. The thermally conductive fillers can have a greater thermal conductivity than the adhesive 44 and the veneer leafs 42. In the illustrated embodiment, these thermally conductive fillers can be mixed in with the adhesive 44 and applied between the veneer leafs 42 to transfer heat away from the veneer leafs 42. Advantageously, the use of the thermally conductive fillers within the adhesive 44 can prevent the veneer leafs 44 from reaching a pyrolysis temperature to prevent the spread or start of a fire within the interior cabin 22 of the aircraft 20.

In certain embodiments, thermally resistive fillers to be added to the adhesive 44 to resist heat transfer within the adhesive 44 and the composite veneer 40. In the illustrated embodiment, the adhesive 44 can include thermally resistive fillers including, but not limited to, intumescent powders. The thermally resistive fillers can have a greater thermal resistivity than the adhesive 44 and the veneer leafs 42. In the illustrated embodiment, these thermally resistive fillers can be mixed in with the adhesive 44 and applied between the veneer leafs 42 to resist heat exposure by expanding in response to heat exposure. Advantageously, the use of the thermally resistive fillers within the adhesive 44 can prevent the veneer leafs 42 from reaching a pyrolysis temperature to prevent the spread or start of a fire within the interior cabin 22 of the aircraft 20.

In the illustrated embodiment, after the adhesive 44 is applied between the veneer leafs 42, the veneer leafs 42 can be compressed together. In certain embodiments, the composite laminate 40 can be compressed under controlled pressure and temperature to provide a desired material characteristic. In certain embodiments, the pressed veneer leafs 42 can be sliced along slice planes 51 to form veneer slices 50. In the illustrated embodiment, the veneer slices 50 can be utilized within the interior cabin 22 of the aircraft 22. The use of veneer slices 50 of the composite veneer 40 allows for multiple veneer slices 50 to have a consistent look and quality.

In the illustrated embodiment, the composite veneer 40 may have a planar shape and during manufacturing of the various cabin components, may be cut to appropriate sizes and shapes. In certain embodiments, the composite veneer 40 may have a substantially consistent thickness that is formed to a desired three dimensional shape during the manufacturing process of the composite veneer 40 to conform to a particular cabin component shape or need. Further, the construction of the composite veneer 40 may allow for structural support of the interior components or another veneer. Advantageously, the overall weight with respect to volume and/or strength of the composite veneer 40 may be substantially less than more traditional materials. Further, the overall thickness of the composite veneer 40 may be substantially less than more traditional materials. In certain embodiments, the composite veneer 40 can be utilized anywhere that is desirable to have fire resistant materials, including but not limited to, ships, buildings, industrial systems, railways and automotive interiors.

Figure 3:
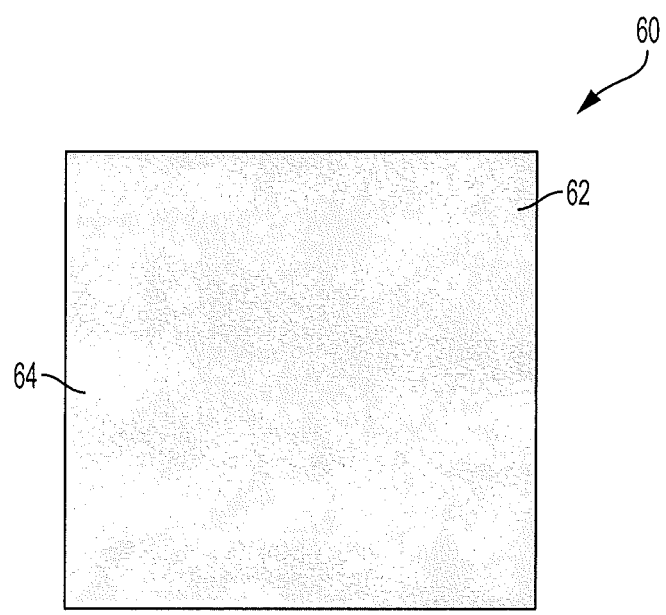
FIG. 3 is a pictorial view of a particle laminate for use with the aircraft interior of FIG. 1.

Referring to FIG. 3, a particle laminate 60 suitable for use as aviation laminate within the interior cabin 22 is shown. In the illustrated embodiment, the particle laminate 60 includes wood particles 62 and adhesive 64. In the illustrated embodiment, the particle laminate 60 can be utilized to provide a decorative or backing surface without the cost or weight of other materials while further providing a fire-resistant material to form interior components of the interior cabin 22.

In the illustrated embodiment, the wood particles 62 can be any suitable wood particles 62 formed from any suitable type of wood or wood element. The wood particles 62 can be mixed with the adhesive 64. In the illustrated embodiment, the adhesive 64 can include a suitable thermal filler as described with respect to adhesive 44. In the illustrated embodiment, the wood particles 62 and the adhesive 64 can be mixed in any suitable ratio to provide a desired particle laminate 60 characteristic. The particle laminate 60 can be compressed under controlled pressure and temperature to provide a desired material characteristic. The particle laminate 60 can be sliced in to thin slices to provide a desired shape and form needed for the interior components of the aircraft 20. Advantageously, the use of the thermal filler additive within the adhesive 64 allows for the particle laminate 60 to provide a desired lever of fire resistance without requiring any additional processing while providing consistent results.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. An aviation laminate, comprising:
a plurality of wooden elements comprising upper and lower outermost wooden element layers and intermediate wooden element layers,
the intermediate wooden elements having a same thickness as the upper and lower outermost wooden element layers; and
an adhesive disposed between the plurality of wooden elements in a plurality of adhesive layers that form a set of intermediate layers between the plurality of wooden elements,
wherein the adhesive is absent from exterior surfaces of the upper and lower outermost wooden element layers and includes a thermal filler, wherein the thermal filler is at least one of graphene, hexagonal boron nitride and intumescent powder.

2. The aviation laminate of claim 1, wherein the plurality of wooden elements is a plurality of veneer leafs.

3. The aviation laminate of claim 1, wherein the plurality of wooden elements are a plurality of wooden particles bonded by the adhesive.

4. The aviation laminate of claim 1, wherein the plurality of wooden elements are pressed.

5. The aviation laminate of claim 1, wherein the plurality of wooden elements are sliced.

6. The aviation laminate of claim 1, wherein the thermal filler is a thermally conductive filler.

7. The aviation laminate of claim 1, wherein the thermal filler is a thermally resistive filler.

8. An aircraft comprising:
an aircraft cabin component including an aviation laminate, the aviation laminate including:
a plurality of wooden elements comprising upper and lower outermost wooden element layers and intermediate wooden element layers, the intermediate wooden elements having a same thickness as the upper and lower outermost wooden element layers; and an adhesive disposed between the plurality of wooden elements in a plurality of adhesive layers that form a set of intermediate layers between the plurality of wooden elements, wherein the adhesive is absent from exterior surfaces of the upper and lower outermost wooden element layers and includes a thermal filler, wherein the thermal filler is at least one of graphene, hexagonal boron nitride and intumescent powder.

9. The aircraft of claim 8, wherein the plurality of wooden elements is a plurality of veneer leafs.

10. The aircraft of claim 8, wherein the plurality of wooden elements are a plurality of wooden particles bonded by the adhesive.

11. The aircraft of claim 8, wherein the plurality of wooden elements are pressed.

12. The aircraft of claim 8, wherein the plurality of wooden elements are sliced.

13. The aircraft of claim 8, wherein the thermal filler is a thermally conductive filler.

14. The aircraft of claim 8, wherein the thermal filler is a thermally resistive filler.

* * * * *